US006625747B1

United States Patent
Tawil et al.

(10) Patent No.: US 6,625,747 B1
(45) Date of Patent: Sep. 23, 2003

(54) COMPUTER STORAGE SYSTEM AND FAILOVER METHOD

(75) Inventors: Ahmad H. Tawil, Round Rock, TX (US); Stephen G. Luning, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 539 days.

(21) Appl. No.: 09/609,085

(22) Filed: Jun. 30, 2000

(51) Int. Cl.[7] .................................................. G06F 11/00
(52) U.S. Cl. ......................................................... 714/6
(58) Field of Search .............................. 714/4, 6, 10, 43; 709/239, 105, 213

(56) References Cited

U.S. PATENT DOCUMENTS

| | | | | |
|---|---|---|---|---|
| 4,381,543 A | * | 4/1983 | Bunten et al. | 710/316 |
| 5,016,244 A | | 5/1991 | Massey, Jr. et al. | 370/16 |
| 5,511,227 A | | 4/1996 | Jones | 395/829 |
| 5,548,783 A | | 8/1996 | Jones et al. | 395/836 |
| 5,666,538 A | | 9/1997 | DeNicola | 395/750.03 |
| 5,729,767 A | | 3/1998 | Jones et al. | 395/882 |
| 5,931,958 A | | 8/1999 | Bouvier et al. | 714/48 |
| 5,961,613 A | | 10/1999 | DeNicola | 710/18 |
| 5,987,621 A | | 11/1999 | Duso et al. | 714/4 |
| 5,989,060 A | | 11/1999 | Coile et al. | 439/489 |
| 5,996,086 A | | 11/1999 | Delaney et al. | 714/4 |
| 6,006,259 A | | 12/1999 | Adelman et al. | 709/223 |
| 6,070,251 A | * | 5/2000 | Chong | 714/12 |
| 6,108,684 A | * | 8/2000 | DeKoning et al. | 709/105 |
| 6,148,414 A | * | 11/2000 | Brown et al. | 714/9 |
| 6,343,324 B1 | * | 1/2002 | Hubis et al. | 709/229 |
| 6,460,113 B1 | * | 10/2002 | Schubert et al. | 711/111 |

OTHER PUBLICATIONS

English language translation of Abstract of Japanese Patent Application No. 09162094 entitled "Method and Systemfor Switching Control Between 1st and 2nd Servers", Jun. 5, 1997.
U.S. Pending patent application Ser. No. 09/464,843 entitled "Method for Storage Device Masking in a Storage Area Network and Storage Controller and Storage Subsystem for Using Such a Method" by Steve Luning and Karl Schubert, Dell USA, L.P. Dec. 16, 1999.

* cited by examiner

*Primary Examiner*—Scott Baderman
(74) *Attorney, Agent, or Firm*—Baker Botts L.L.P.

(57) ABSTRACT

The present disclosure describes a system and method of performing failover in a storage area network. In one embodiment of the present disclosure, a computer network includes a host and a storage system associated with the host. The storage system has a first controller with a first port and a second controller with a second port. The first controller is assigned a common node name and the first port is assigned a first port name. The second controller is assigned a common node name and the second port is assigned a second port name. More specifically a multipathing driver is operable to determine a signal path for a communication sent to a storage device associated with the first controller and the second controller and operable to perform failover operations if the signal path fails.

18 Claims, 1 Drawing Sheet

COMPUTER STORAGE SYSTEM AND FAILOVER METHOD

TECHNICAL FIELD

The present disclosure relates in general to the field of computers and computer networks and, more particularly, to a method for failover in a storage area network (SAN) and system for using such method.

BACKGROUND

The demand for data storage capacity in computer networking environments increases dramatically each year. One of the reasons driving such demand is an increase in the number of data-intensive applications conducted over network environments. Examples of such tasks include internet applications, multimedia applications, data warehousing, online transaction processing, and medical imaging. Along with this need for increased storage capacity, users demand faster access to the data and greater reliability. In addition to these demands, network operators often desire methods and systems to continue to operate effectively after a network component has malfunctioned or failed.

A storage area network (SAN) is a network developed to address many of the above concerns. A conventional SAN includes a collection of data storage devices sometimes referred to as a "storage pool" communicatively coupled to one or more hosts such as a workstation or server. In the present disclosure, the term "host" and "server" are used interchangeably, with the understanding that a "server" is one type of "host."

The hosts can access the storage pool using Fiber Channel protocol, whose functionality is generally well known. Signals between a host and a storage pool are often directed through a switching element within a switch fabric and controllers which direct signals to and from data storage devices within the storage pool.

Often times, high availability storage area networks are configured with redundant components such that if one component fails, the duties of that component may be performed by its redundant counterpart. In this manner, a SAN may continue to operate, despite the failure of one component. For example, if a switch component malfunctions, signals between the host and the storage pool may be rerouted through the redundant component. These redundant components act as a back up. The rerouting of the signal through the redundant component is often referred to as "failover".

One problem with conventional SANs is establishing which component is responsible for detecting a malfunction and initiating a failover operation. This problem is heightened by the fact that network components are often made by different manufacturers. Accordingly, components may have compatibility problems requiring failover solutions custom tailored for the specific components in the system.

One of these methods Uses a filter failover device driver. This method typically requires the use of vendor-specific software code which is stored on the host. The software code is specific to the storage pool and must be supported on each host operating system in the SAN. One disadvantage of this solution is that supporting the software within a network having multiple hosts and multiple operating systems requires costly development and testing. Also, the supporting software must be loaded and maintained on each host. Because hosts are often connected to multiple storage pools, each host must then maintain multiple filter failover device drivers. As the number of hosts and storage pools rises, maintenance of the filter failover device drivers becomes increasingly burdensome.

Another failover method is sometimes referred to as Auto LUN transfer. This method requires the host to reroute the input and output (I/O) requests to the storage unit on an alternate path when access to the storage unit fails on the primary path. Simple rerouting does not provide a standard method of determining the state of the storage unit and may require the host to monitor I/O coming from the storage unit controller to determine appropriate failover actions. The I/O signals used for monitoring the storage unit controller are often vendor specific. Thus, the host must monitor vendor specific status in the server OS, and is a disadvantage of this method.

Another failover method is to utilize Host Independent Controller Failover. Host Independent Controller Failover typically involves monitoring the path from within the storage pool. While this method works well when a controller within the storage unit fails, a failure in the path, such as a switch failure, may not be detected.

SUMMARY

In accordance with teachings of the present disclosure, a system and method for failover in a storage area network are provided with significant advantages over prior developed methods and systems. The present disclosure presents a method and system to identify paths and controllers to enable more efficient, scalable failover within a SAN.

According to one aspect of the present disclosure, a computer network includes a host and a storage system associated with the host. The storage system has a first controller with a first port and a second controller with a second port. The first controller is assigned a common node name and the first port has a first port name. The second controller is assigned a common node name and the second port has a second port name. More specifically the common node name assigned to the first controller and the second controller may be a common world wide node name. Also, the first port name may be a world wide port name and the second port name may be a world wide port name. It is a technical advantage of the present invention to assign the same common node name to the first controller and the second controller. In this manner the host sees the first controller and the second controller as a single node which allows for simplified failover logic within the host.

According to another aspect of the present invention, a computer system for retrieving and storing information, including a storage device, a first controller associated with the storage device, and a second controller associated with the storage device is disclosed. The first controller preferably has a common node name and has a first port that is assigned a first port name. The second controller preferably has the same common node name and has a second port that is assigned a second port name. More specifically the first controller and the second controller are both associated with a common memory.

According to yet another aspect of the disclosure a method for transmitting data in a computer network includes assigning a common world wide node name to a first controller in a network. The first controller may be associated with a common storage within the computer network for use in storing and retrieving information from the common storage. The method also includes assigning the same common world wide node name to a second controller associated with the common storage for use in storing and retrieving information from the common storage. Also a first world wide port name may be assigned to a first port associated with the first controller, and a second world wide port name may be assigned to a second port associated with the second controller. A data request may then be sent to the common memory routed through the first controller and the first port. After determining that the data request was unsuccessful, the data request may be routed through the second port and second controller.

It is a technical advantage of the present invention to associate or pair controllers associated with common storage by assigning both controllers the same world wide node name. This simplifies the logic necessary to allow the host to reroute a data request after a data request has failed.

It is a further technical advantage of the present invention to provide a standardized host failover method that is not specific to the vendor of the controllers or the host.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
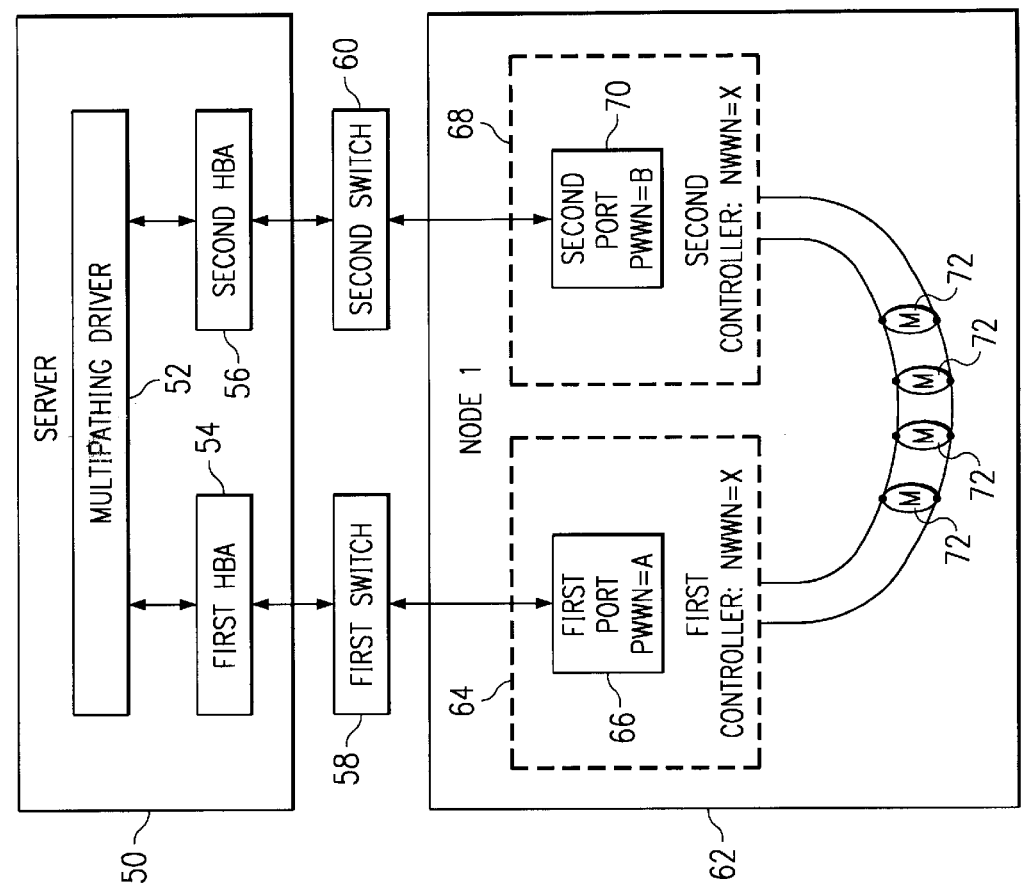
FIG. 1 is a schematic diagram showing a storage area network (SAN) according to the present disclosure.
Figure 2:
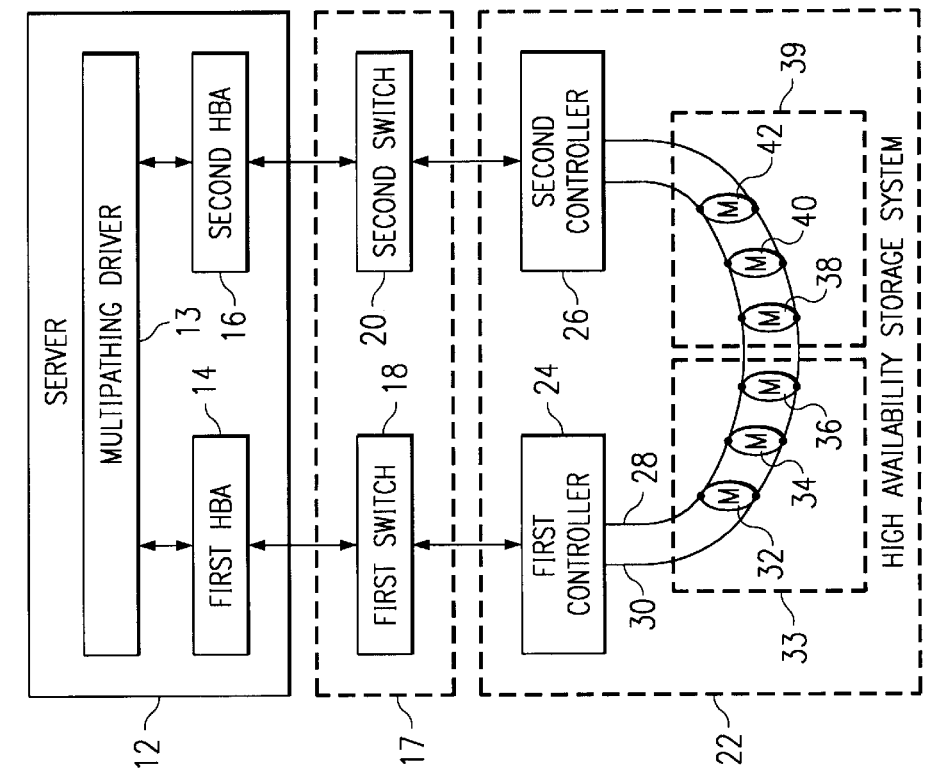
FIG. 2 is a schematic diagram of a network including a multipathing device driver according to the present disclosure.

Preferred embodiments and their advantages are best understood by reference to FIGS. 1 and 2, wherein like numbers are used to indicate like and corresponding parts.

Referring now to FIG. 1, a schematic diagram of storage area network (SAN) 10 according to the present disclosure is shown. SAN 10 includes server 12 communicatively coupled to high availability storage system 22. Server 12 includes multipathing driver 13, first host bus adapter (HBA) 14 and second HBA 16. First HBA 14 and second HBA 16 are preferably communicatively coupled to multipathing driver 13. First HBA 14 may be communicatively coupled to first switch 18. First switch 18 may be communicatively coupled to first controller 24 within high availability storage system 22. Second HBA 16 may be communicatively coupled to second switch 20. Second switch 20 is communicatively coupled to second controller 26 within high availability storage system 22. In the present embodiment, first switch 18 and second switch 20 are a part of switch fabric 17.

High availability storage subsystem 22 includes first controller 24 and second controller 26. First controller 24 may be communicatively coupled to memory devices 32, 34, 36, 38, 40 and 42. Storage devices 32, 34, 36, 38, 40 and 42 are also preferably communicatively coupled to second controller 26. In the present embodiment, Storage devices 32, 34, 36, 38, 40 and 42 are both communicatively coupled to first controller 24 and second controller 26 by first communication path 28 and second communication path 30. In this embodiment, high availability storage system 22, first controller 24, and second controller 26 may be operable to monitor the transfer of data within high availability storage subsystem and perform failover operations within high availability storage system 22. In an alternative embodiment, the number of storage devices communicatively coupled to controllers 24 and 26 may be increased or decreased.

In the present embodiment, first HBA 14 and second HBA 16 are preferably hardware components within server 12. First host bus adapter 14 and second host bus adapter 16 may each perform similar functions. First, host bus adapter 14 and second host bus adapter 16 may send input to high availability storage subsystem 22 and receive output from high availability storage system 22. In this embodiment, both first HBA 14 and second HBA 16 are connected to and preferably "see" memory storage devices 32, 34, 36, 38, 40, and 42. Multipathing driver is preferably connected to both first HBA 14 and second HBA 16, multipathing driver contemplates or "sees" each storage device 32, 34, 36, 38, 40, and 42 as a singular component. In other words, while first HBA 14 and second HBA 16 collectively contemplate two instances of each storage device 32, 34, 36, 38, 40, and 42, multipathing driver 13 contemplates each storage device 32, 34, 36, 38, 40, and 42 only once and communicates this to server 12.

Multipathing driver 13 monitors the I/O flow directed through first HBA 14 and second HBA 16. This may also be referred to as monitoring the flow of information through different signal paths in this embodiment. A first signal path preferably extends through first HBA 14, first switch 18 and first controller 24. A second signal path preferably extends through second HBA 16, second switch 20, and second controller 26. In the event that multipathing driver 13 determines that the signal path between first HBA 14 and high availability storage system 22 is not functioning properly, multipathing driver 13 may reroute input data being sent to high availability storage system 22 through second HBA 16 or second signal path.

Similarly, in the event that second HBA 16 determines that either second switch 20 or second controller 26 has malfunctioned or has stopped functioning properly, second HBA 16 may reroute input data being sent to high availability storage system 22 through first HBA 14 and first switch 18.

In the present embodiment, the connectors which communicatively couple first HBA 14 and second HBA 16 to first switch 28 and second switch 20 as well as the connection between first switch 28 and first controller 24 and second switch 20 and second controller 26 are all fiber channel (also known as "fibre" channel) connections. Fiber channel connections transmit data between computer devices at a data rate of up to one billion bits per second and faster. Fiber Channel can operate using optical fibers, coaxial cable, telephone twisted pair wire, or another suitable communication material as the physical medium used to communicatively couple the components of the system. Furthermore, the present system contemplates the use of more than a single communication material used as the physical medium.

In the present embodiment, the Fiber Channel connections may be operated according to a set of standards known as the fiber channel physical and signaling standard: ANSI X3.230-1944 which is sometimes referred to as ISO 14165-1. In accordance with this standard, unique identifiers or addresses are assigned to objects within a fiber channel network. These unique identifiers are often referred to as "word wide names." For an object such as a node, a unique node world wide name and a unique port world wide name may be assigned. Often, the world wide name is a 64 bit identifier made up of a 24-bit company identifier assigned by the IEEE and 36-bit identifier specified by individual vendors. In the present embodiment, a world wide node name is assigned to first controller 24. A world wide port name is also assigned to the port of first controller 24. Also, a world wide node name is assigned to second controller 26 and a world wide port name is assigned to the port of second controller 26.

In the present embodiment, first controller 24 and second controller 26 are preferably assigned a common world wide node name, that is, the world wide node name assigned to first controller 24 is the same as the world wide node name assigned to controller 26. The port world wide name given to the port of first controller 24 is preferably different from the port world wide name assigned to the port associated with controller 26. Assigning a common worldwide name to first controller 24 and second controller 26 is one of the technical advantages of the present invention. Among other advantages, the assignment of a common worldwide name for first controller 24 and second controller 26 simplifies the logic, interchangeability, and scalability of first HBA 14 and second HBA 16. Assigning a common world wide name to first controller 24 and second controller 26 allows multipathing driver 13 to route I/Os through either first controller 24 or second controller 26 as if there were only a single controller with a dual port assembly. One particular advantage with this embodiment is that controller redundancy is maintained while failover logic in the multipathing driver is simplified.

In the present embodiment, first switch 18 and second switch 20 are preferably a part of switch fabric 17. Alternatively, first switch 18 and second switch 20 may be implemented as individual components for transferring data within a network. Also, in the present embodiment, first controller 24 and second controller 26 are distinct components. In an alternative embodiment, first controller 24 and second 26 may be associated in a dual controller component. Also, in an alternative embodiment, controllers 24 and 26 may be raid controllers.

In the present embodiment, storage devices 32, 34, 36, 38, 40, and 42 may include disk drives, tape drives, raid drives, or any other suitable computer storage component. Storage devices 32, 34, 36, 38, 40, and 42 may preferably be grouped in two or more storage device pools or groups. Storage devices that have been grouped together may also be referred to as volumes, raid volumes, or data sets. In the present embodiment storage devices 32, 34, and 36 are preferably grouped in first storage group 33 and storage devices 38, 40, and 42 are grouped in second storage group 39. Furthermore, the present embodiment contemplates either more or fewer memory storage devices associated with first controller 24 and second controller 26.

In operation, multipathing driver 13, first controller 24, and second controller 26 may coordinate the transfer of I/O requests to storage devices 32, 34, 36, 38, 40, and 42. Two preferred schemes for managing I/O flow are known as "active/active" and "active/passive" or alternatively as dual ownership and single ownership. An active/active or dual ownership scheme is shown in FIG. 1. In this embodiment, first controller 24 and second controller 30 are each responsible for groups of storage devices 33 and 39. Here, first controller 24 preferably has ownership of first storage group 33 and second controller 30 has ownership of second storage group 39. In operation, for example, when multipathing driver sends an I/O request to storage device 34, the I/O request is sent through the first signal path—through first HBA 14, first switch 18, and first controller 24. If this request fails, multipathing driver 13 reroutes the I/O request through the second path—through second HBA 16, second switch 20, and second controller 26.

In one preferred embodiment, multipathing driver 13 and high availability storage system 22 may be operable to transfer the ownership of storage device 34 after the I/O request through the first signal path failed but was successfully completed via the second signal path. In other words, after a failover operation is necessary, storage device 34 may then be transferred into second storage group 39 such that second controller 30 is primarily responsible for I/O requests sent to storage device 34. Alternatively, ownership of all the devices within first storage group 33 may be transferred to second controller 30 after a failover operation is performed. These failover related transfer operations may also be referred to as LUN transfers. A LUN or logical unit is an identifier of the storage devices.

Furthermore, when a failover operation has been performed, high availability storage system 22 may also transfer data from a memory cache associated with first controller 24 to second controller 30. Controllers 24 and 30 often store or cache data prior to transferring it to a storage device. Data is often temporarily stored in the controller cache memory prior to being transferred to a storage device because data may be saved more expediently in the controller cache and later transferred to the storage device.

Now referring to FIG. 2, network 48 includes server 50 and storage system 62. Server 50 includes multipathing device driver 52, first HBA 54 and second HBA 56. First HBA 54 is communicatively coupled with multipathing device driver 52. Second HBA 56 is communicatively coupled to multipathing device driver 52 as well.

First switch 58 is communicatively coupled to first HBA 54, first switch 58 is also communicatively coupled to port A 66 of controller A 64. Second switch 60 is communicatively coupled to second HBA 56. Controller B is also communicatively coupled to switch 60 via port B 70. High availability storage system 62 includes first controller 64 and second controller 68. First port 66 is disposed within first controller 64. Second port 70 is disposed within second controller 68. Several shared memory storage devices 72 are communicatively coupled to both first controller 64 and second controller 68.

In the present embodiment, first port 66 is preferably assigned a first port name. In this embodiment, first port world wide name "A" is assigned. Second port 70 may be assigned a second port name. In this embodiment, second port world wide name "B" is assigned. Also, both first controller 64 and second controller 68 are preferably assigned the same common node name or common node world wide name, "X". The assignment of common node names to first controller 64 and second controller 68 presents several advantages. For example, assigning node and port names in this manner allows for simplified control and failover logic within multipathing device driver 52. In one aspect, multipathing device driver may contain logic that understands common storage devices 72 to be accessible through either first port 66 or second port 70. Both first port 66 and second port 70 may be considered to be associated with the a single node when the, in fact, first port 66 and second port 70 are associated with separate controllers 64 and 68.

In operation, multipathing device driver 52 is preferably associated with first HBA 54 and second HBA 56. Also, multipathing device driver 54 may be operable to determine a signal path for a communication sent to a shared memory storage device 72. When multipathing driver 52 determines that the signal path between first HBA 54 and first controller 64 is not functioning properly, multipathing device driver 52 may preferably reroute the communication to shared memory device 72 through second port 70 and second controller 68. Multipathing driver 52 may detect signal path failure or malfunction using a number of techniques. For example, multipathing driver 52 may receive a failure notification from first or second switch 18 or 20 or from first or second HBA 14 or 16. As another example, after multipathing driver 52 has sent an I/O request to storage system 62, if no response is received within a predetermined period, the request has "timed out" and the signal path is determined to have failed or malfunctioned. After determining that the signal path has failed, the communication is preferably rerouted from common node name and the first port name to common node name and the second port name. In effect, rerouting requires only a change in port name, the node name is not changed. Similarly, if multipathing driver identifies a malfunction between second HBA 16 and second controller 68, the communication can be rerouted through first controller 64.

The present embodiment may be as an active/passive or single ownership system. In this embodiment, first controller 64 is assigned ownership of storage devices 72. Second controller 68 acts as a back-up component until a failover operation is performed. At that time ownership of storage devices 72 may be transferred to second controller 68 as well as the memory cache of first controller 66 similar to the embodiment of FIG. 1. In the present embodiment, first HBA 54 and second HBA 56 are associated with multipathing device driver 52 within server 50. In an alternative embodiment, first HBA 54, second HBA 56, and multipathing device driver 52 may be consolidated into a single component or software application within server 50 or operating independently of server 50.

Although the disclosed embodiments have been described in detail, it should be understood that various changes, substitutions and alterations can be made to the embodiments without departing from their spirit and scope.

What is claimed is:

1. A computer network for storing and retrieving data comprising:
    a storage system and at least one associated host;
    the storage system having a first controller with a first port and a second controller with a second port;
    the first controller having a common node world wide name and the first port having a first port world wide name;
    the second controller having the same common node world wide name and the second port having a second port world wide name; and
    the at least one associated host having a multipathing driver in communication with the first controller and the second controller operable to determine a signal path for a communication to a common storage device associated with the first controller and the second controller.

2. The computer network of claim 1 further comprising:
    a first host bus adapter and a second host bus adapter associated with the multipathing driver;
    the first host bus adapter connected to the first controller; and
    the second host bus adapter connected to the second controller.

3. The computer network of claim 1 further comprising the multipathing driver operable to provide load balancing between the first controller and the second controller.

4. The computer network of claim 1 further comprising the multipathing driver operable to present the common storage device to the host.

5. The computer network of claim 1 wherein the storage system further comprises a high availability storage system.

6. The computer network of claim 1 further comprising:
    a first fiber channel switch associated with the host and with the first controller; and
    a second fiber channel switch associated with the host and with the second controller.

7. The computer network of claim 1 further comprising:
    the first controller associated with a plurality of common storage devices; and
    the second controller associated with the plurality of common storage devices.

8. The computer network of claim 7 wherein the plurality of common storage devices comprises at least one common raid drive.

9. The computer network of claim 1 further comprising:
    a first storage group of at least one storage device and a second storage group of at least one storage device;
    first controller and second controller each associated with each storage group; and
    first controller assigned ownership of first storage group and second controller assigned ownership of second storage group.

10. The computer network of claim 1 further comprising:
    at least one storage device associated with first controller and second controller;
    the first controller assigned ownership of the at least storage device; and
    the second controller operable to receive a transfer of ownership of the at least one storage device.

11. A computer system for retrieving and storing information comprising:
    a storage system having at least one storage device;
    a first controller associated with the at least one storage device, the first controller assigned a common node world wide name;
    the first controller having a first port, the first port assigned a first port world wide name;
    a second controller associated with the at least one storage device, the second controller assigned the same common node world wide name; and
    the second controller having a second port, the second port assigned a second port world wide name.

12. The computer system of claim 11 further comprising:
    the first controller comprising a first raid controller; and
    the second controller comprising a second raid controller.

13. The computer system of claim 11 wherein the at least one storage device comprises at least one raid drive.

14. The computer system of claim 11 further comprising:
    the first controller associated with at least one common memory drive; and
    the second controller associated with the at least one common memory drive.

15. The computer system of claim 11, wherein the storage system further comprises a high availability storage system.

16. A method for transmitting information within a fiber channel computer network comprising:
    assigning a common node world wide name to a first controller associated with a common memory within the computer network for use in storing and retrieving information from the common memory;

assigning the same common node world wide name to a second controller associated with the common memory within the computer network for use in storing and retrieving information from the common memory;

assigning a first port world wide name to a firs t port associated with the first controller;

assigning a second port world wide name to a second port associated with the second controller;

sending a data request to the common memory routed through the first port and the first controller;

determining if the data request was unsuccessful; and sending the data request to the common memory routed through the second port and the second controller.

17. The method of claim 16 further comprising balancing the routing of requests to the common memory through the first port and the second port based upon a preselected ratio.

18. The method of claim 16 further comprising:

measuring the flow of information through a first signal path and a second path; and balancing the routing of requests to the common memory through the first signal path and the second signal path based upon the measured flow of information through the first signal path and the second signal path.

* * * * *